(12) United States Patent
McWhorter

(10) Patent No.: US 6,653,007 B2
(45) Date of Patent: Nov. 25, 2003

(54) HYDROGEN GENERATOR FOR FUEL CELL OPERATION

(76) Inventor: Edward Milton McWhorter, 6931 Green Brook Cir., Citrus Heights, CA (US) 95621

( * ) Notice: Subject to any disclaimer, the term of this patent is extended or adjusted under 35 U.S.C. 154(b) by 24 days.

(21) Appl. No.: 10/072,166

(22) Filed: Feb. 11, 2002

(65) Prior Publication Data

US 2003/0150718 A1 Aug. 14, 2003

(51) Int. Cl.$^7$ ................................................ H01M 8/18
(52) U.S. Cl. ........................... 429/19; 429/27; 429/28; 429/34; 429/36; 429/38; 429/39
(58) Field of Search ......................... 429/36, 122, 128, 429/131, 132, 134, 136, 137, 139, 321–323, 231.9, 231.95, 233, 103, 104, 105, 19, 27, 28, 34, 38, 39; 204/198, 206

(56) References Cited

U.S. PATENT DOCUMENTS

| | | | |
|---|---|---|---|
| 3,617,385 A | * 11/1971 | Gray | 429/39 |
| 4,436,793 A | * 3/1984 | Adlhart | 429/17 |
| 6,042,704 A | * 3/2000 | Joshi et al. | 204/265 |

* cited by examiner

*Primary Examiner*—Bruce F. Bell

(57) ABSTRACT

The invention is a hydrogen generator for supplying hydrogen to the anode of a fuel cell and electrons to the fuel cell electrical circuit. The hydrogen generator employs a consumable electrode comprising an alkali metal which is brought into contact with an aqueous solution of its hydroxide liberating hydrogen. The hydrogen generator operates as an alkaline cell electrode emersed in the electrolyte that is continuously being formed by the oxidation of the alkali metal within the electrode by its reaction in the electrolyte with the cycled water produced at the cathode of the fuel cell. The current flow within the hydrogen generator internal circuit of the reaction chamber is approximately equivalent to the feed rate of the consumable electrode into the electrolyte and the quantity of hydrogen formed is proportional to the equivalent weight of the water reacted.

7 Claims, 3 Drawing Sheets

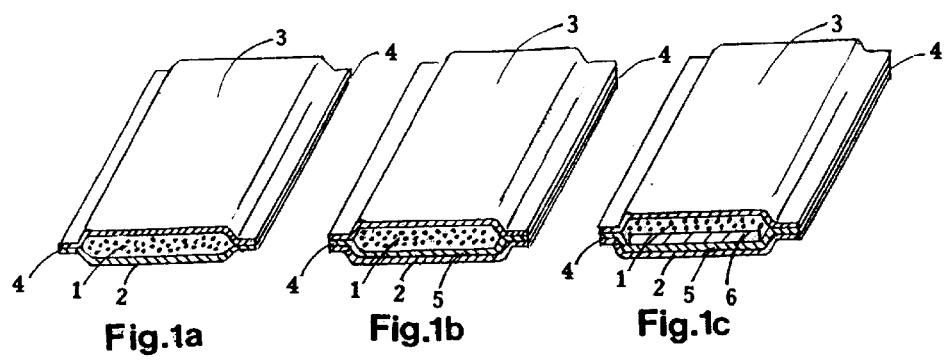
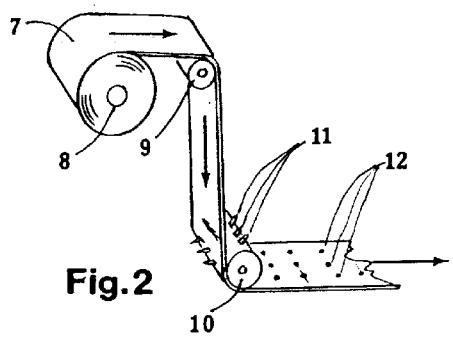
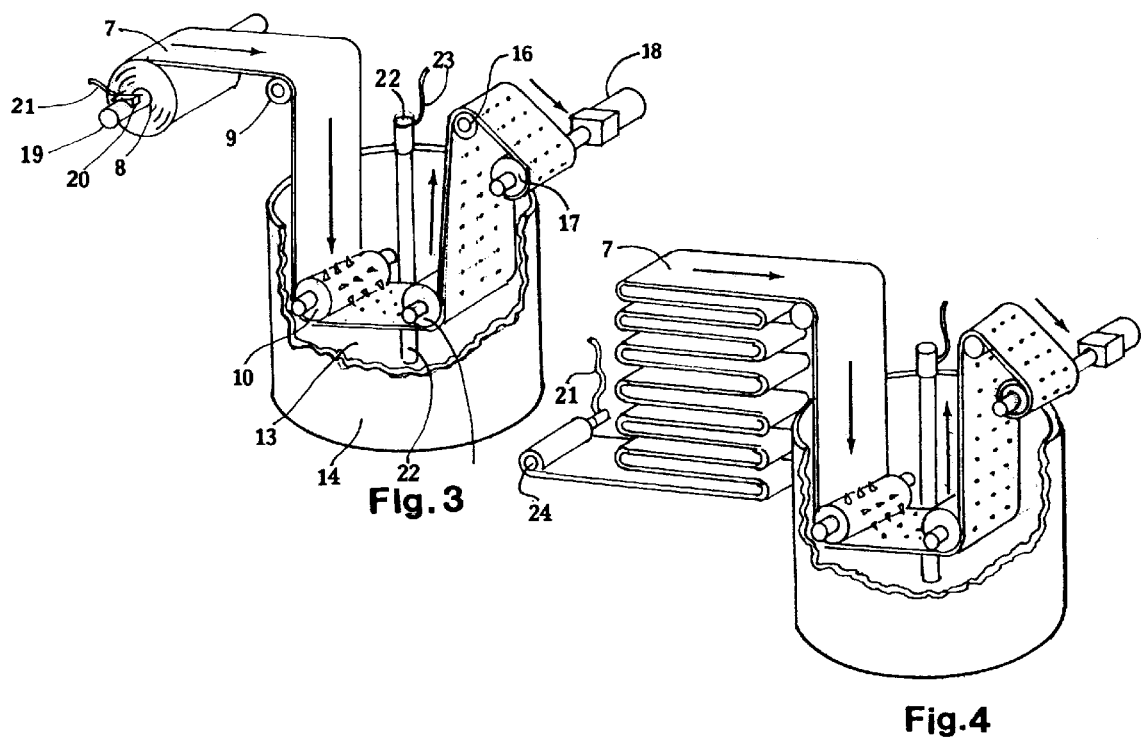

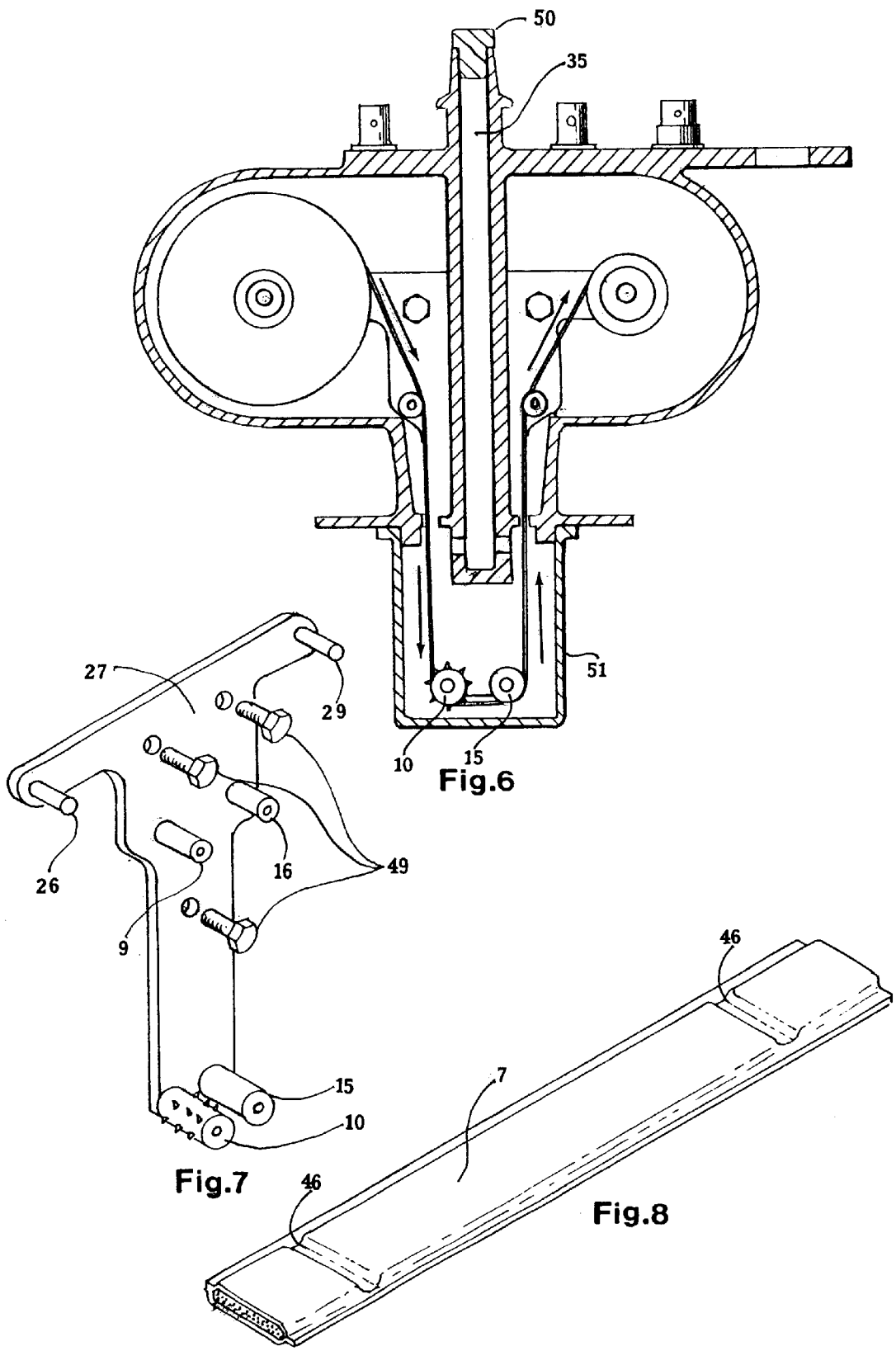

HYDROGEN GENERATOR FOR FUEL CELL OPERATION

BACKGROUND OF THE INVENTION

Basic hydroxides are formed with the liberation of hydrogen when the alkali metals lithium, sodium and potassium react with water. Two equivalent weights of each reactant are required to produce hydrogen in its diatomic form.

$$2Li + 2H_2O \rightarrow 2LiOH + H_2 \uparrow$$

$$2Na + 2H_2O \rightarrow 2NaOH + H_2 \uparrow$$

$$2K + 2H_2O \rightarrow 2KOH + H_2 \uparrow$$

In the invention, the hydrogen produced in these reactions is used as a fuel source in a fuel cell and the liquid product of each reaction is employed as an electrolyte to produce electron flow between anode and cathode electrodes emersed in the alkaline solution—as in the instance of the Edison Cell which employs a potassium hydroxide solution.

Other elements such as the alkaline earths, magnesium and calcium, react with water to produce hydrogen but with greater difficulty, requiring the application of heat. In the detailed description in this application only the alkali metals are shown to be of practical interest and the discussion will be centered upon the use of sodium because of its greater abundance in nature.

The invention is a consumable electrode comprised of alkali metal particles in a dispersed phase within an inert heavy liquid medium that is applied by roller, or by other means, to the center surfaces of an inert flexible tape. A cover tape is then placed on top of the first tape containing the dispersion and both tapes are sealed together at their contacting edges forming a consumable electrode, hereinafter called the electrode. The finished electrode is then wound upon a spool in a dispensing cartridge or folded in layered form within a magazine dispenser. In operation, the tensile load on the electrode in the rolled package is nearly constant during its transit through the electrolyte in the reaction chamber, whereas the tensile load in the layered package is dynamically intermittent and higher, but it has the advantage of more efficient utilization of packaging space.

In some designs, particular in the larger electrode construction, a drying agent such as diatomaceous earth or calcium or silica powders may be applied upon the dispersion surface to facilitate manufacture and to promote, by capillary action or surface adsorption, migration of water into the electrode when emersed in the electrolyte. Because of the high heat of reaction when greater quantities of the dispersion are employed an inner glass cloth tape is employed for higher tensile strength of the electrode and to facilitate in holding larger quantities of the metallic dispersion in place during the manufacturing process.

Sealing the lower tape containing the metallic dispersion with the cover tape together at their edges in this manner forms a flattened tubular structure with the alkali metal reactant within. Therefore it is easily seen by those skilled in the art that the consumable electrode described in the application can also be manufactured as a plastic tubular structure by filling it with the dispersion through hydraulic means using a pump or vacuum to induct the dispersion into the tube. The method of manufacturing the tubular construction of the electrode does not effect the proprietary nature of this application.

Present methods used by others to supply hydrogen to a fuel cell employ methane gas reformers or methanol reformers, and in other instances by high pressure storage bottles or by cryogenic storage at −450° F. The reforming methods require high temperatures necessary to crack the fuel molecule and strip off the hydrogen component leaving a carbon residue which must be disposed of. Pressure bottle or cryogenic storage of hydrogen raise concerns of leakage in home garages, where most household water heaters are located, or in indoor communal parking areas of hotels and apartment complexes where building fires may occur. In the invention described in this application hydrogen is not present until there is a demand for its generation and immediate usage. Hydrogen is generated directly from the water and no carbon residue is formed except that which is in the tape and dispersion medium and this is continually processed into the spent electrolyte. The water of the electrolyte comes from the fuel cell which facilitates its service during refueling.

The bonding strength of an alkali metal with the hydroxyl ion is much lower than that of its corresponding halide bond. For this reason the reduction of the fused hydroxyl salt of an alkali metal to its base metal is more economic than that of its halide salt. As an example, sodium hydroxide melts at 318.4° C. and sodium chloride melts at 800.4° C. It is evident that the production of metallic sodium by high temperature electrolyses is more economical from its hydroxide than from its halide salt. To reduce the cost of fuel cell operation by use of a consumable electrode it is prudent that the expended electrolyte, in the reaction cell of the invention to be described, be recovered for recycling during replacement of the consumable electrode cartridge during refueling.

SUMMARY OF THE INVENTION

The invention is an electrochemical method of supplying hydrogen and electrons to a fuel cell. The design uses a reactive sodium electrode, hereinafter called a consumable electrode. The consumable electrode is formed as a sodium dispersion that is applied by continuous roller application, or by other means, upon a tape, or by hydraulic induction into a tubing, both tape and tubing being sufficiently flexible such that they may be wound upon a spool for insertion in a dispensing cartridge that feeds the consumable electrode into a caustic electrolyte solution. The quantity of hydrogen and electron flow generated by this means is approximately proportional to the feed rate of the consumable electrode into the electrolyte and to the quantity of the dispersed sodium metal reacted.

The primary objective of the invention is to provide a method of hydrogen generation for use in automotive fuel cells and other types of mobile equipment.

It is another object of the invention to show a means of servicing the fuel cell with a new consumable electrode dispensing cartridge by quick-disconnect mechanism, replacing the expended cartridge at a fuel station.

It is yet another object of the invention to provide an additional supply of electrons to a storage battery or directly to the fuel cell by hydrolysis of the sodium within the consumable electrode with the water content of the electrolyte that produces a migration of charged ions moving between the poles of the cathode and anode of the consumable electrode cartridge.

It is still another object of the invention to show a means of scavenging the expended electrolyte for reclaiming its sodium content.

BRIEF DESCRIPTION OF THE DRAWINGS

Drawings are presented which show the manufacture and method of using a consumable electrode in the production of hydrogen and electron flow to a fuel cell.

FIGS. 1a, 1b, and 1c, are cross-sections of the three variations of construction of the consumable electrode.

FIG. 2 illustrates a preferred method of puncturing the consumable electrode during continuous operation from a spool.

FIG. 3 illustrates the method of reacting the punctured consumable electrode in a vessel filled with electrolyte.

FIG. 4 illustrates an alternate method of packaging the consumable electrode.

FIG. 6 is an illustration of consumable electrode package for insertion into a fuel cell hydrogen and electrical flow circuits.

FIG. 7 is a yoke for mounting the consumable electrode in a cartridge container.

FIG. 8 illustrates the method of sealing across the width of the consumable electrode at regularly spaced intervals.

DETAILED DESCRIPTION OF THE INVENTION

Figure 5:
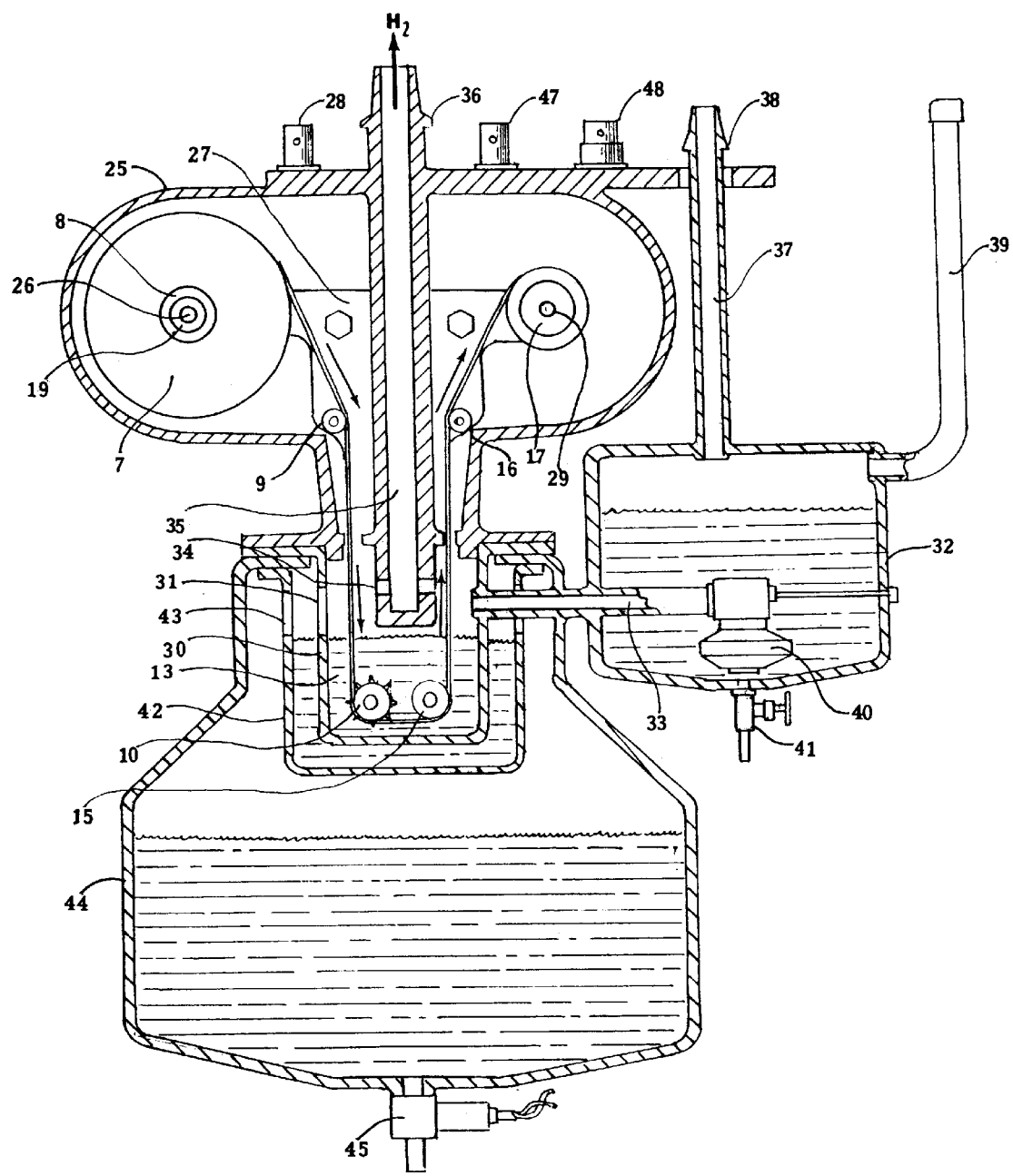
FIG. 5 is an illustration of a consumable electrode cartridge placed in a reaction chamber and the interface connections necessary to service a fuel cell.

The invention is a consumable electrode that is to be used for the production of hydrogen flow to the anode of a fuel cell with the simultaneous generation of electron flow to the fuel cell electrical circuit. In the description of the consumable electrode construction only the alkali metals are of practical interest and the discussion of their typical application in the invention will be centered upon the use of sodium for the purpose of clarity, and because of the greater abundance of sodium in nature making it more economically significant in this application.

A sodium dispersion in a heavy base mineral oil or other neutral medium is prepared by heating the metal above its melting point (207.5° F.) and rapidly mixing it in the medium. A suspending agent, such as oleic acid in trace amount, is added during the mixing to keep the metal particulate in the dispersed phase while it is being further processed. The sodium dispersion produced is hereinafter referred to as the dispersion.

The prepared dispersion is applied to the metalized surface of a plastic tape by continuous roller application which places the dispersion principally in the center area of the tape leaving the outer edges free of the dispersion material. A second tape, hereinafter called the cover tape, of equal width is placed over the tape containing the dispersion and both tapes are sealed together at their edges to prevent air contact with the dispersion during storage.

Three variations of the design of the consumable electrode are claimed and the cross-section of each variation are presented in FIGS. 1a, 1b, and 1c. The cross-sectional thicknesses of the elements of their construction shown in FIGS. 1a, 1b, and 1c are presented in exaggerated scale for clarity.

Referring to FIG. 1a of drawing sheet 1. In FIG. 1a the consumable electrode is comprised of a dispersion 1 that is applied to the center area of tape 2. A cover tape 3 is placed upon the said dispersion 1. Tape 2 and cover tape 3 are sealed together at their contacting edges 4 on each side hermetically sealing the dispersion 1 within. Tape 2 and tape 3 form the outer casing of the consumable electrode and are hereinafter called the carrier insulation.

Referring to FIG. 1b. The consumable electrode of FIG. 1b comprises the same elements of FIG. 1a, dispersion 1, tape 2, and cover tape 3. Tape 2 is metalized on the surface 5 that holds dispersion 1 for more effective electrical conduction.

Referring to FIG. 1c. The consumable electrode of FIG. 1c comprises the same elements as FIG. 1b. A glass-cloth tape 6 of lesser width than tape 2 and cover tape 3 is placed upon the metalized surface 5 of tape 2 before the application of dispersion 1. Glass-cloth tape 6 helps to hold dispersion 1 upon metallic surface 5 when dispersion 1 is applied in greater quantities. Glass-cloth 6 also increases the tensile strength of the consumable electrode at higher operating temperatures when dispersion 1 is thicker.

Referring now to FIG. 2 of sheet 1 of the drawings which is a perspective view of consumable electrode 7 that is wound upon spool 8 which passes over guide roller 9 and is pulled under pin roller 10. A plurality of needle sharp pins 11 are fixedly attached to the surface of pin roller 10 producing puncture holes 12 perforating both sides of the hermetically sealed carrier insulation exposing dispersion 1 within.

Referring now to FIG. 3 of sheet 1 of the drawings which shows a means of submerging consumable electrode 7 into an electrolyte 13 within reaction vessel 14 and the recovery of the expended carrier insulation of the consumable electrode 7 that passes under electrolyte spool 15 and over guide roller 16 to rewind spool 17 that is turned by gear motor 18. The multiple puncture holes 12 perforate the carrier insulation of consumable electrode 7 impermeable tape membranes on each side exposing hermetically sealed dispersion 1 within to the gradual diffusion of the water content of electrolyte 13 into dispersion 1. In the reaction of the alkali metal of dispersion 1 with the water content of the electrolyte 13 that also contains the cycled water of the fuel cell, hydrogen gas is liberated and the corresponding metal hydroxide is formed as previously shown above. An electrical potential is also produced within the electrolyte 13 between the rotating electrode 19 within spool 8 and electrolyte electrode 22. Conduction of the current flow generated is carried in the external circuit through electrical brush 20 in rotative contact with rotating electrode 19 that is in electrical contact with conductor 21 and by conductor 23 in contact with electrolyte electrode 22. Said conductors 21 and 23 are electrically connected to the corresponding terminals of the fuel cell.

Referring now to FIG. 4 of sheet 1 of the drawings which illustrates a different method of packaging the consumable electrode 7. In FIG. 4 the consumable electrode 7 is shown packaged in folded layers. This method is preferred for consumable electrodes having a thicker cross-section that cannot be easily rolled upon a spool. In the folded packaging the rotating electrode 19 and brush 20 are replaced with stationary electrode 24. All of the remaining numbered elements of FIG. 4 are the same as those shown in FIG. 3 and serve the same purpose and therefore the elements of each figure are the same. In operation the tensile load on the consumable electrode in the rolled package as shown in FIG. 3 is nearly constant, whereas the tensile load in the layered package is subject to higher dynamic force and is intermittent but it has the advantage of more effective utilization of packaging space.

Turning now to FIG. 5 of sheet 2 of the drawings. FIG. 5 illustrates the manner of mounting spool 8 holding the consumable electrode 7 of FIG. 3 into dispensing cartridge case 25. The rotating electrode 19 of FIG. 3 is shown in FIG. 5 as being mounted on axle 26 of mounting yoke 27. Brush 20 and conductor 21 of FIG. 3, not shown in FIG. 5, conducts current flow from electrode 19 to service pin 28 which interfaces with the fuel cell electrical circuit.

The consumable electrode 7 wound on spool 8 is mounted on axle 26 of mounting yoke 27 and is passed over guide roller 9, and under pin roller 10 and electrolyte roller 15 and upward over guide roller 16 and fixedly attached to rewind spool 17 that is rotatively mounted on axle 29 of said mounting yoke 27. The mounting yoke 27 is shown in perspective view in FIG. 7 of sheet 3 of the drawings. After mounting the consumable electrode 7 on mounting yoke 27 the said mounting yoke is fastened to dispensing cartridge case 25 by bolts 49 and the two halves of the cartridge case are hermetically sealed together at their flanging surfaces. Storage plug 50 inserted in hydrogen tube 35 and storage cap 51 is placed over the lower flanged end to cover the roller pin 10 and electrolyte roller 15 for storage is shown in FIG. 6 of sheet 3 of the drawings.

Returning now to FIG. 5. The dispensing cartridge case 25 that is loaded with consumable electrode 7 as described above is inserted into electrically insulated reaction chamber 30 holding electrolyte 13. Electrolyte 13 fills the said reaction chamber to its operating level of weir openings 31. The electrolyte 13 is produced from water in holding tank 32 supplied to the said reaction chamber 30 through pipe 33. The reaction of the water from pipe 33 in contact with dispersion 1 through the puncture holes 13 of the carrier insulation of consumable electrode 7 form the metal hydroxide and liberate hydrogen. The liberated hydrogen passes through holes 34 of hydrogen tube 35 that interfaces at connector fitting 36 with the fuel cell. Water formed in the fuel cell enters holding tank 32 through water tube 37 interface connector fitting 38. Make up water is supplied to holding tank 32 through fill pipe 39. Water is pumped to reaction chamber 30 by submerged pump 40. Water is drained from holding tank 32 through valve 41. Electrolyte electrode 22 of FIG. 3, but not shown in FIG. 5, is electrically connected by conductor 23 to service pin 47 which interfaces with the corresponding electrical circuit of the fuel cell. Utility connector 48 connects the various electrical equipment, valves, pumps, and sensors that operate the system, to the electrical supply interface.

Excess electrolyte in reaction chamber 30 passes from reaction chamber 30 through weir 31 spilling into baffle chamber 42. The excess electrolyte held in baffle chamber 42 spills out over weir 43 into expended electrolyte reservoir 44 which is emptied through normally closed solenoid valve 45 for reclaiming its metal content.

Referring now to FIG. 8 of sheet 3 of the drawings. In FIG. 8. the consumable electrode 7 is pinched together and sealed 46 at regular intervals across its width. Sealing at points 46 limits the amount of hydrogen blow-back into unreacted dispersion 1 within the consumable electrode 7. During periods when the system is not in operation the seal 46 prevents migration and diffusion of water vapor into the unreacted portion of dispersion 1 within consumable electrode 7.

What is claimed is:

1. A hydrogen generator comprising a rotating electrode, said rotating electrode fixedly attached to a spool, said spool rotatively mounted on an axle, said axle mounted within a dispensing cartridge case, an electrical, brush in rotative contact with said rotating electrode, a consumable electrode wound upon said rotating electrode, said consumable electrode comprising a dispersion of an alkali metal suspended within a neutral medium, said dispersion being applied to a metallized surface of an impermeable tape membrane, hereinafter called the lower tape, an impermeable cover tape membrane placed upon said lower tape and said dispersion and hermetically sealed with the said lower tape at their contacting edges forming a tubular encasement, said consumable electrode passing over a guide roller and downward into a reaction chamber containing an electrolyte, a pin roller rotatively mounted in said reaction chamber, said consumable electrode passing under said pin roller and under an electrolyte roller also rotatively mounted in said reaction chamber, said consumable electrode being punctured by said pin roller opening the interior of said consumable electrode placing said interior holding said dispersion of alkali metal suspended in neutral medium in chemical reactive contact with water in said electrolyte, said consumable electrode passing upward from said electrolyte roller to a second guide roller rotatively mounted in said dispensing cartridge case, said consumable electrode passing over said second guide roller to a rewind spool operating in said dispensing cartridge case, said hydrogen generator having a holding tank, a fill pipe to fill said holding tank with water, a pump to supply water from said holding tank to said electrolyte in said reaction chamber through a pipe, said electrolyte flowing out of said reaction chamber over a weir into a baffle chamber, an electrolyte electrode submerged in said electrolyte of said baffle chamber, said baffle chamber electrolyte flowing out of said baffle chamber over a weir into an electrolyte reservoir, said punctured consumable electrode reaction with the said water in the electrolyte of said reaction chamber liberating gaseous hydrogen in said reaction chamber which passes from said reaction chamber through a hydrogen tube, electrons generated in said reaction of said punctured consumable electrode with said water in said electrolyte migrate by ionic charge through the said reaction chamber electrolyte to the said electrolyte of the said baffle chamber and are discharged at the said electrolyte electrode, said discharged electrons flowing out of said electrolyte electrode by electronic conduction through a conductor to the said electrical brush.

2. The consumable electrode of claim 1 comprising an impermeable tape membrane having a metallized surface, said impermeable tape membrane and said metallized surface hereinafter called the lower tape, a glass-cloth tape of narrower dimension than the said lower tape is positioned upon the center areas of said metallized surface of said lower tape, a dispersion of an alkali metal suspended in a neutral medium, said dispersion being applied to said glass cloth tape, a second impermeable cover tape membrane placed on top of said dispersion and hermetically sealed with the said lower tape at their contacting edges.

3. The consumable electrode of claim 1 sealed across its width at regularly spaced intervals.

4. The consumable electrode of claim 1 in which diatomaceous earth is applied to said dispersion.

5. The consumable electrode of claim 1 in which a silica powder is applied to said dispersion.

6. The consumable electrode of claim 1 in which an alkaline earth metal is applied to said dispersion.

7. A hydrogen generator comprising a stationary electrode, said stationary electrode in contact with a consumable electrode, said consumable electrode comprising a dispersion of an alkali metal suspended within a neutral medium, said dispersion being applied to a metallized surface of an impermeable tape membrane, hereinafter called the lower tape, an impermeable cover tape membrane placed upon said lower tape and said dispersion and hermetically sealed with the said lower tape at their contacting edges, said consumable electrode folded in layers, said folded consumable electrode placed in a magazine dispenser, said consumable electrode passing over a guide roller and downward into a reaction chamber containing an electrolyte, a pin roller rotatively mounted in said reaction chamber, said consumable electrode passing under said pin roller and under an electrolyte roller also rotatively mounted in said reaction chamber, said consumable electrode being punctured by said pin roller opening the interior of said consumable electrode placing said interior holding said dispersion of alkali metal suspended in a neutral medium in chemical reactive contact with water in said electrolyte, said consumable electrode passing upward from said electrolyte roller to a guide roller rotatively mounted in said dispensing cartridge case, said hydrogen generator having a holding tank, a fill pipe to fill said holding tank with water, a pump to supply water from said holding tank to said electrolyte in said reaction chamber through a pipe, said electrolyte flowing out of said reaction chamber over a weir into a baffle chamber, and electrolyte electrode submerged in said electrolyte of said baffle chamber, said baffle chamber electrolyte flowing out of the said baffle chamber over a weir into an electrolyte reservoir, said punctured consumable electrode reaction with the said water in the electrolyte of said reaction chamber liberating gaseous hydrogen in said reaction chamber which passes from said reaction chamber through a hydrogen tube, electrons generated in said reaction of said punctured consumable electrode with water in said electrolyte migrate by ionic charge through the said reaction chamber electrolyte to the said electrolyte of the said baffle chamber and are discharged at the said electrolyte electrode, said discharged electrons flowing out of said electrolyte electrode by electronic conduction through a conductor to the said stationary electrode.

* * * * *